United States Patent [19]

Daly

[11] Patent Number: 4,628,153
[45] Date of Patent: Dec. 9, 1986

[54] STAND-ALONE KEYPHONE SYSTEM

[76] Inventor: Marshall Daly, 740-A Cieneguitas St., Santa Barbara, Calif. 93110

[21] Appl. No.: 682,194

[22] Filed: Dec. 17, 1984

[51] Int. Cl.⁴ .............................................. H04M 1/00
[52] U.S. Cl. ................................... 379/163; 200/5 E; 379/164
[58] Field of Search .............. 179/99 H, 99 R, 99 LS, 179/81 R, 18 AD, 156; 200/5 B, 5 E

[56] References Cited

U.S. PATENT DOCUMENTS

| | | | |
|---|---|---|---|
| 3,927,283 | 12/1975 | Kunimine | 200/5 E X |
| 4,011,413 | 3/1977 | Phillips | 179/99 H X |
| 4,132,860 | 1/1979 | Rasmussen | 179/99 H |
| 4,169,217 | 9/1979 | Szanto | 179/81 C |
| 4,228,324 | 10/1980 | Rasmussen et al. | 179/99 H |

Primary Examiner—James L. Dwyer
Attorney, Agent, or Firm—Albert O. Cota

[57] ABSTRACT

A stand-alone keyphone system that is designed to be installed at any location where it is desired that a plurality of telephone lines be available to each of many user points. The system operates independently of all other systems and without the need for a KSU or a central control unit. Each system allows a plurality of telephone lines to be connected and operated simultaneously and a plurality of systems may be connected within each installation with minimal loading of telephone lines. The system comprises, within a single housing, a DTMF telephone set and a key adapter set that further comprises all the mechanical and electronic circuits to operate the system including a switching subsystem and hold circuit subsystem. The system incorporates a hold pushbutton for placing any of the telephone lines on hold, a set of four telephone line accessing pushbuttons; and a set of line status LED's that indicate if the corresponding line is idle, ringing, busy or holding.

12 Claims, 15 Drawing Figures

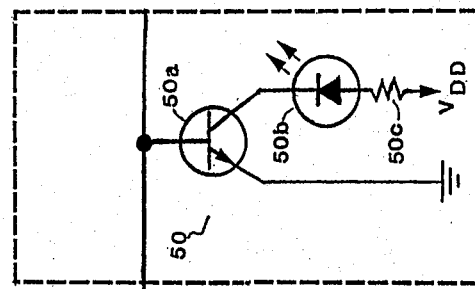
FIG. 12
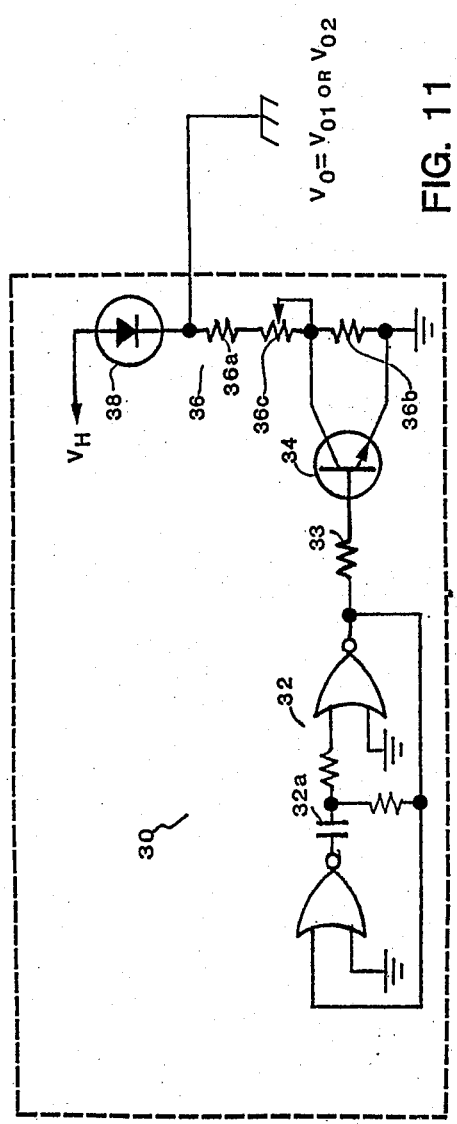
FIG. 9
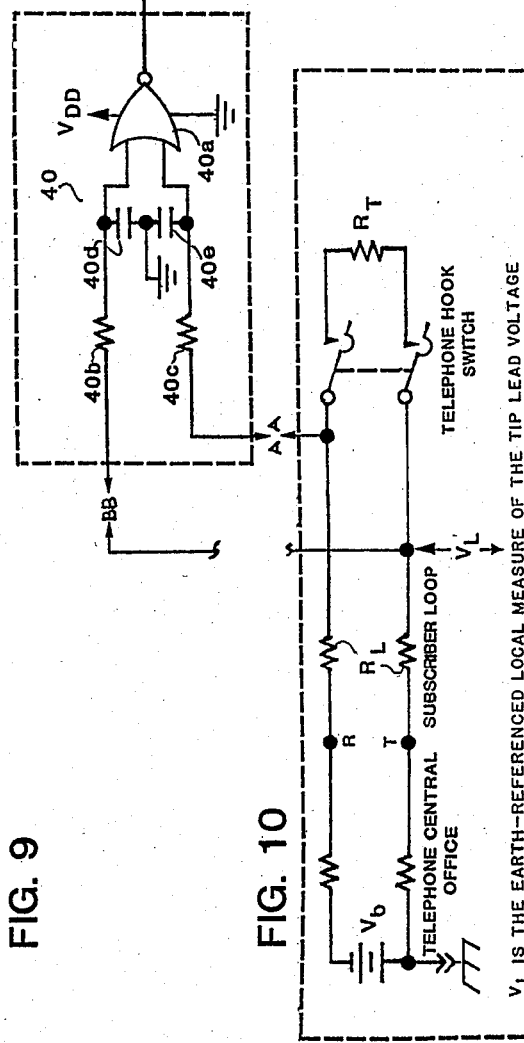
FIG. 11
FIG. 10
$V_L$ IS THE EARTH-REFERENCED LOCAL MEASURE OF THE TIP LEAD VOLTAGE

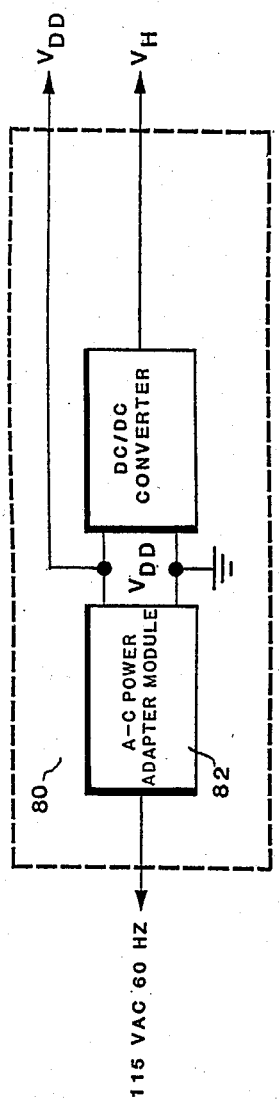
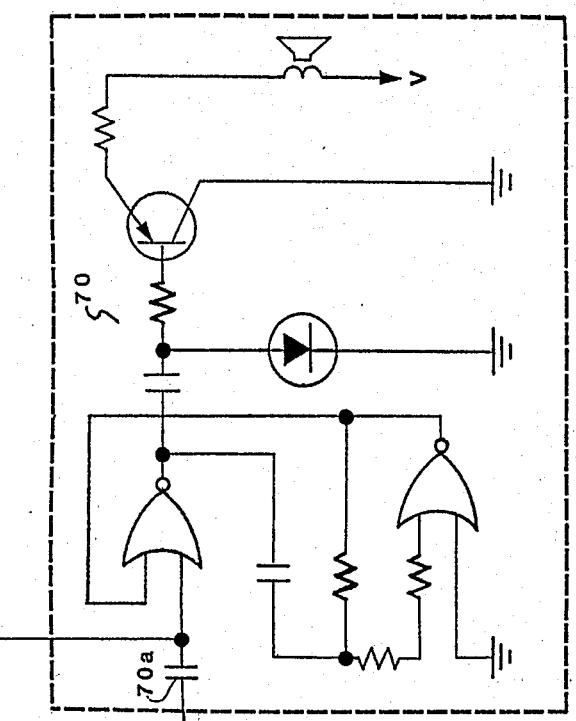
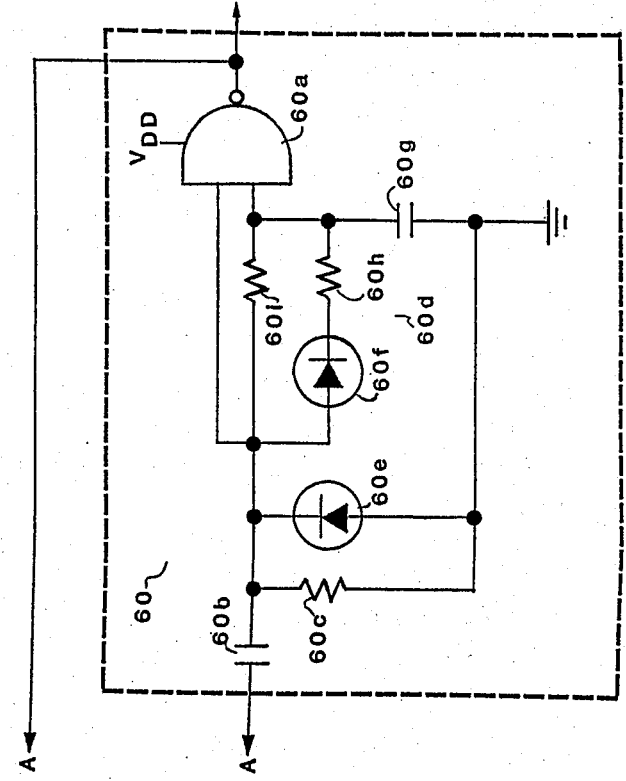

STAND-ALONE KEYPHONE SYSTEM

TECHNICAL FIELD

The invention pertains to the general field of key telephone systems and more particularly to a multiline stand-alone keyphone system that can be operated without the need for a KSU or a central control unit.

BACKGROUND ART

Telephone installations where a plurality of telephone lines, Private Branch Exchange (PBX) extensions or a combination of telephone lines and PBX extensions that are connected directly to a single telephone set are referred to as key telephone systems, key systems or keyphone systems. Such systems are intended for use primarily in small companies, large residences, and in departments of larger organizations where a PBX is used. A keyphone system offers greater convenience, flexibility and control than a single PBX extension, and on premises where no PBX is provided, a key system obviates the need to have two or more telephone sets on each desk where a plurality of lines are used.

Keyphone systems are generally more expensive than an equivalent number of single-line telephone sets, especially in installations that require from two to five telephone lines and/or PBX extensions. Thus, the cost to the subscriber becomes an important factor in determining whether to install such a system.

One reason for the high cost is that the system includes a central control unit that must be set-up and installed at a location remote from the telephone sets. The control unit involves a substantial cost, both for the control unit itself and for the auxiliary wiring that must be attached between the control unit and each of the telephone sets. The telephone sets themselves are also expensive since they are especially made to accommodate the maximum number of key functions for which the system has been designed.

Conventional keyphone systems additionally involve a much larger maintenance allocation for total life cycle costs than do single line telephone sets. With the latter, or with residential sets, public attitudes and policies now accept over-the-counter delivery of customer equipment, installation by the user via modular jacks, and trouble isolation by the user that obviates expensive service calls where user may carry-in his set to a repair facility that supports detachable sets.

The complexity of conventional keyphone systems has discouraged extension of this economy to such keyphones.

Although there are other telephone systems available that provide a form of two-line service at a relatively low cost, none of these existing two-line systems has the capability or offer the full convenience and flexibility of keyphone systems.

A search of the prior art did not disclose any patents that read directly on the claims of the instant invention. However, the following U.S. patents are considered related and indicative of the state-of-the art:

| U.S. Pat. No. | INVENTOR | ISSUED |
| --- | --- | --- |
| 4,169,217 | Szanto, A. | 25 September 1979 |
| 4,132,860 | Rasmussen, H. | 2 January 1979 |

-continued

| U.S. Pat. No. | INVENTOR | ISSUED |
| --- | --- | --- |
| 4,011,413 | Phillips, R. | 8 March 1977 |

The Szanto patent discloses a line status apparatus that is used with telepone sets not having built-in telephone line status indicators. The apparatus comprises a line sensing circuit including a transducer that is applied across the Tip and Ring leads of a telephone line. The circuit/transducer generates an output while any terminal attached to the line is off-hook. The output, in turn, is used to activate a visual indicator that indicates the off-hook condition.

The Rasmussen patent discloses a hold control that allows a two-line, multiple telephone set installation to be converted into a keyphone system. The hold control unit is connected in series between the telephone central office lines and the telephone set. The telephone lines are connected to separate inputs provided at each control unit at each station so that telephone calls can be received or initiated over either of the lines using the telephone set at that station.

Each control unit includes a hold circuit which is responsive to a hold switch, and that provides for establishing a hold condition on one of the lines over which a telephonic connection has been made through the telephone central office. The hold circuit connects a line terminating impedance across the line that is to be held and concurrently applys a hold condition indicating signal onto the line by periodically varying the line terminating impedance. The impedance establishes a condition on the line that simulates and is interpreted by the central office as an off-hook condition which causes the central office to maintain the connection with the remote party. The hold condition is automatically terminated when the held line assumes an actual off-hook condition.

The Phillips patent discloses an electronic hold circuit for a single line telephone. The circuit provides a single electronics sensing and latching circuit connected across the telephone lines. The circuit responds to the voltage across the lines, and operates in conjunction with a plurality of hold actuating circuits that apply a secondary, not normally encountered, voltage on the lines where such voltage causes the latching circuit to switch the line to a hold condition. The latching circuit remains quiescent in response to the relatively high voltage on the phone lines in the on-hook condition and the relatively low voltage in the off-hook condition, and responds to an intermediate hold signaling voltage for latching the line in a hold condition.

DISCLOSURE OF THE INVENTION

The stand-alone keyphone system is designed to be installed anywhere where there is a requirement that a plurality of telephone lines be available to a single user point. Each system, in addition to being self-contained, operates independently of all other systems located within the usage area. The self-contained term also implies that the system operates without the need of a separate Key Service Unit (KSU) or a central control unit that is normally installed at a location remote from the telephone sets.

Each system allows a plurality of telephone lines to be operated simultaneously and a plurality of systems may be connected at each installation. A typical office installation includes ten systems and four telephone lines or PBX extensions where each system has separate access to each of the four lines or extensions.

The preferred embodiment of the system has attached a single cable assembly that includes a plug-in a-c power adapter incorporating a set of RJ14C modular jacks where each jack accepts two telephone lines. With this configuration, a system with a four line capability is simply installed by plugging-in the a-c adapter to a standard 115 volt a-c power outlet and connecting one end of a telephone line cable to the adapter modular jacks and the other end to a modular jack serviced by the telephone company.

The system as disclosed may be configured in either of two embodiments. In the first or preferred embodiment, the system includes integrally within a single system housing, a Dual-Tone Multi-Frequency Signaling (DTMF) telephone set and an inventive key adapter set that comprises all the subsystems, circuits, and controls, that further comprise the system. In a second embodiment the key adapter set is designed as a separate unit having a standard RJ11 modular jack that allows an external DTMF telephone set to be connected.

In either embodiment, the system features a hold button for placing any of the telephone lines on hold, four telephone line accessing pushbuttons and a set of line status LED's that indicate if the corresponding telephone line is either idle, ringing, busy or holding. The system may also include an adjustable ringer-volume control, and a standard modular jack that allows the connection of an auto-dialer, a speaker phone or other readily available telephone accessories.

The primary electrical power for the system's solid-state electronics and electrical devices is provided by the a-c adapter. However, a back-up power system may also be included that allows the system to operate and the line status LED's to illuminate if the a-c power source should fail. The back-up system operates on a standard 9-volt battery mounted within the system housing.

The inventive aspect and nucleus of the system is the key adapter set that comprises a switching subsystem, a hold circuit subsystem and a line status display subsystem that is further comprised of five circuits: a threshold generator, a threshold sensor, a lamp display, a ring discriminator and an annunciator. The above elements synergistrically operate to provide the functions required for the system.

The primary object of the invention is to provide a stand-alone keyphone system that functions without the need of a KSU or a remotely located central control unit. Additionally, it is also an object of the invention to provide a keyphone system that:

allows a defect in the system to be easily isolated to either a specific keyphone or to a telephone central office problem by modular substitution of one keyphone system for another, incorporates line status sensing and display which permits the user to optimize adjustment to varying conditions of central office battery voltage and distance, provides multi-system reliability in that no single system failure will impair operation of other systems within an installation, is cost effective in terms of initial purchase price vs. paying the key telephone installation charge and subsequent keyphone periodic service charge, can be easily installed at a relatively low cost and operated by an unskilled person, incorporates a novel hold circuit that places a telephone line in a hold condition while the telephone set is temporarily disconnected from the line and that provides reliable and consistent operation in keyphone systems installed at varying line distances from the telephone central office.

incorporates a purely mechanical, maintenance free telephone line switching subsystem that functions in conjunction with the hold circuit.

has a user interface similar to the conventional 1A2 key system, allowing users familiar with that system to use the disclosed system without additional instruction, is designed to achieve a relatively high Mean-Time-Between-Failure (MTBF).

BRIEF DESCRIPTION OF THE DRAWINGS

FIG. 9 is a schematic of the threshold generator circuit.

FIG. 10 is a schematic of the essential elements comprising a typical telephone line loop.

FIG. 11 is a schematic of the threshold sensor circuit.

FIG. 12 is a schematic of the lamp display circuit.

FIG. 13 is a schematic of the ring discriminator circuit.

FIG. 14 is a schematic of a typical annunciator circuit.

FIG. 15 is a block diagram of a typical power supply.

BEST MODE FOR CARRYING OUT THE INVENTION

Figure 1:
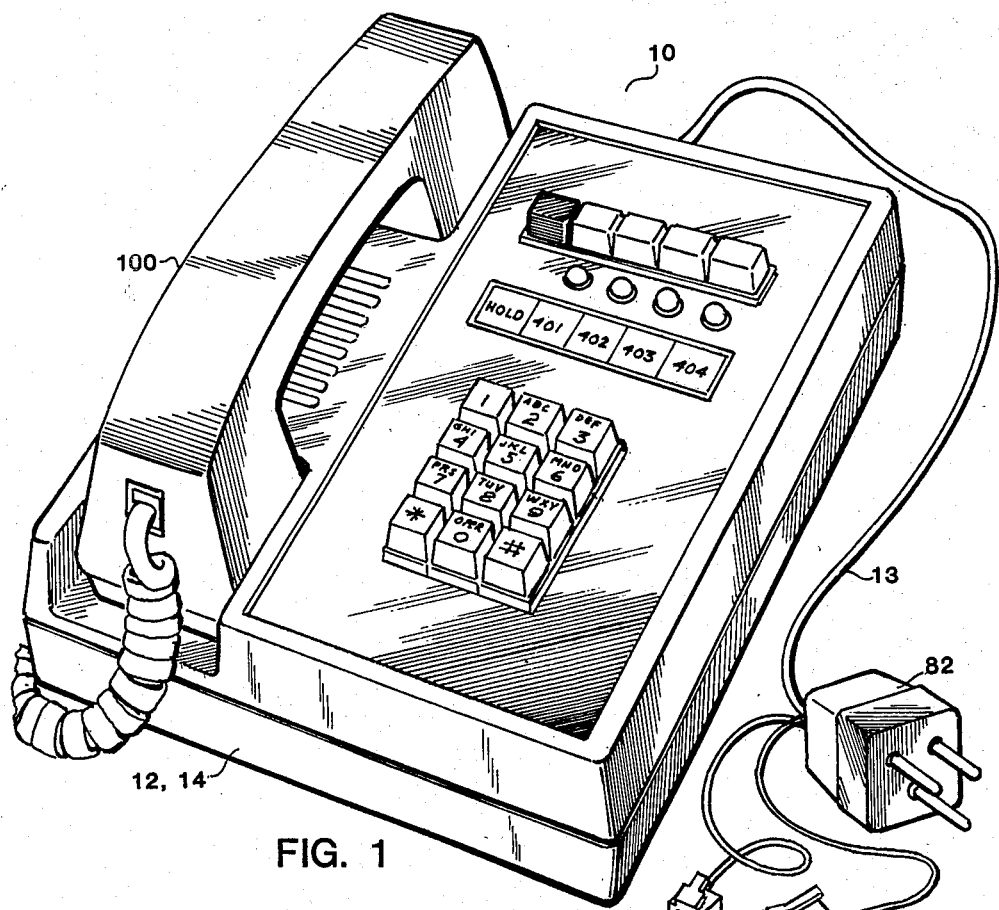
FIG. 1 is a perspective view of a stand-alone keyphone system having the telephone set and key adapter integrally housed.
Figure 2:
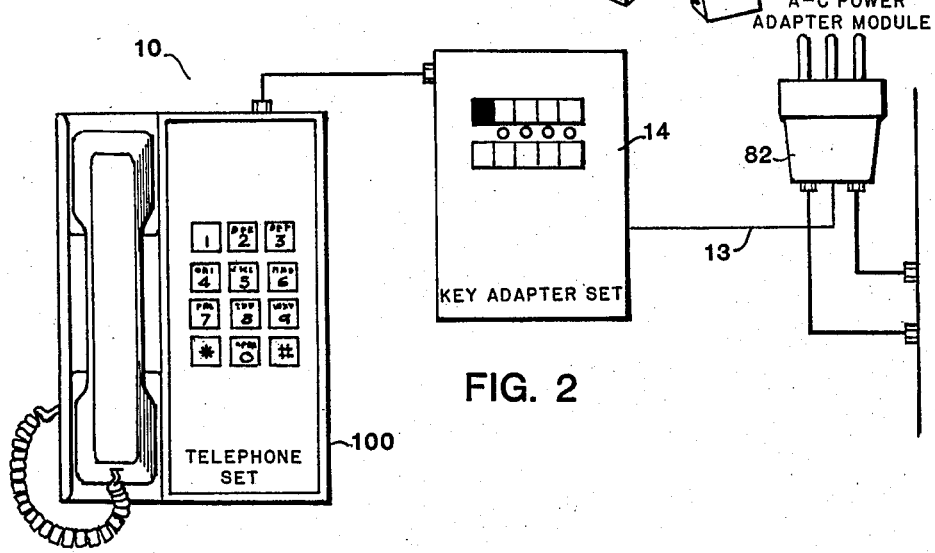
FIG. 2 is a plan view of the system where the key adapter set is a separate element having provisions to connect a standard DTMF telephone set.

The best mode for carrying out the invention is presented in terms of a preferred embodiment, as shown in FIG. 1, that is comprised of a stand-alone keyphone system 10. A second embodiment is also disclosed that is comprised of two separate elements: a standard DTMF telephone set and a key adapter set. The key adapter set in the second embodiment, as shown in FIG. 2, is connected between the telephone set and the wall jack supplying the incoming telephone lines. Aside from the physical difference there is no functional difference between the two embodiments. Therefore, in the discussion that follows, reference is made only to the preferred embodiment. The overall system function and operation is initially presented which is then followed by a description of the individual sets, subsystems and major circuits that synergistically operate the system.

Figure 3:
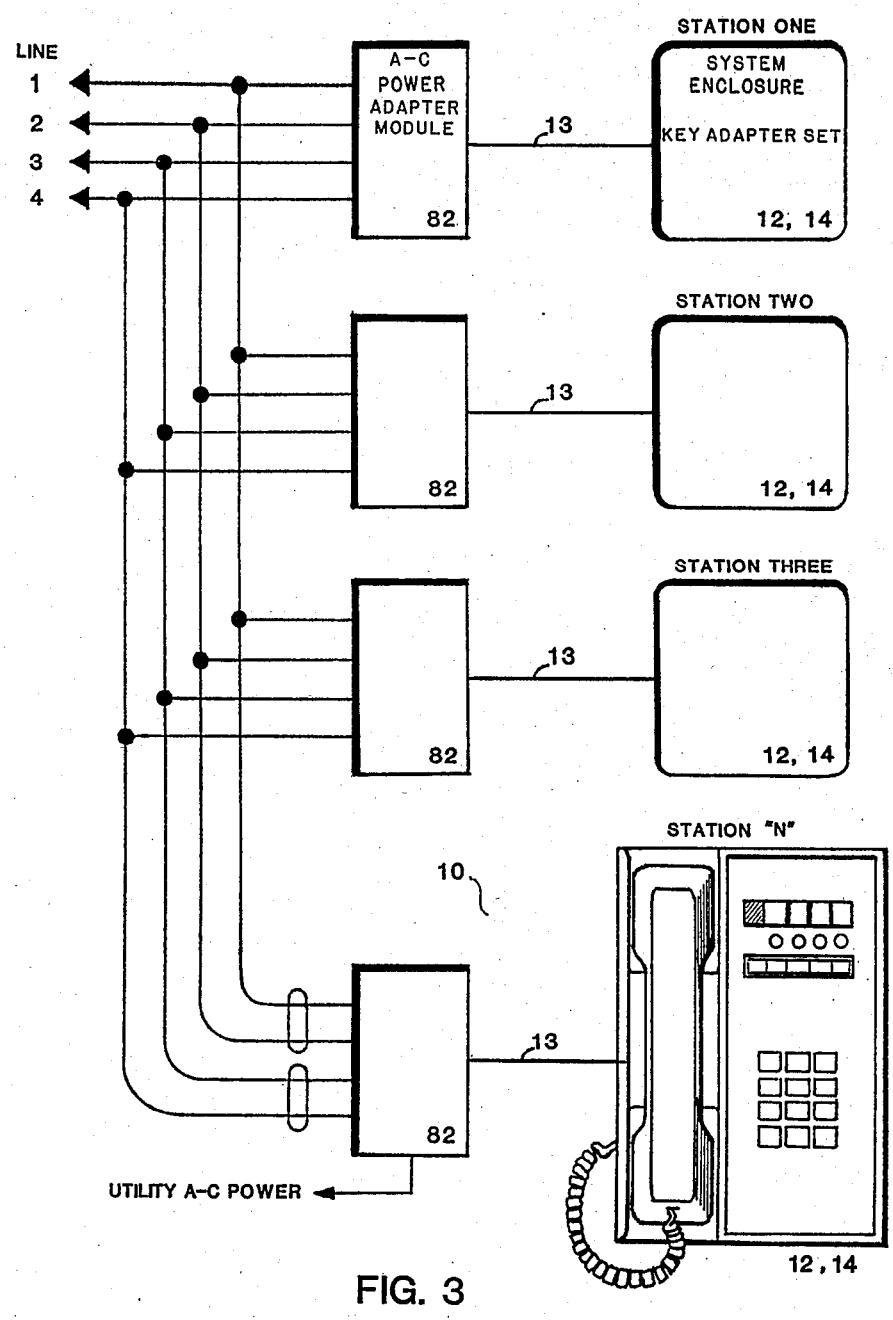
FIG. 3 is a schematic representation showing the preferred embodiment of the system connected to "N" stations.

Each system 10 allows a plurality of telephone lines to be operated simultaneously and a plurality of systems or stations may be connected at each home or office location. In the preferred embodiment, as shown in FIG. 3, the system 10 is configured to accommodate four separate telephone lines. Four lines are preferred due to the availability, cost-effectiveness and simplified circuit mechanization provided by the quad two-input digital logic gates used in the preferred design. With respect to the number of stations, up to "N" stations, as also shown in FIG. 3, may be controlled at each installation. However, ten stations per location is the preferred quantity due to electrical mechanization and loading considerations.

The system requires no inter-connections between stations other than the availability at each station of the telephone lines and public utility a-c power. The telephone lines may be either telephone central office lines (public utility) PBX lines, private lines, or any combination of lines appropriate to the particular situation. Additionally, a plurality of hook-up schemes for the four lines are possible. For example, one system may have one line shared by all the stations, two lines shared only by selected stations, and one personal/private line available at only one specific station or some combination of central office lines, private lines and PBX extensions.

Figure 4:
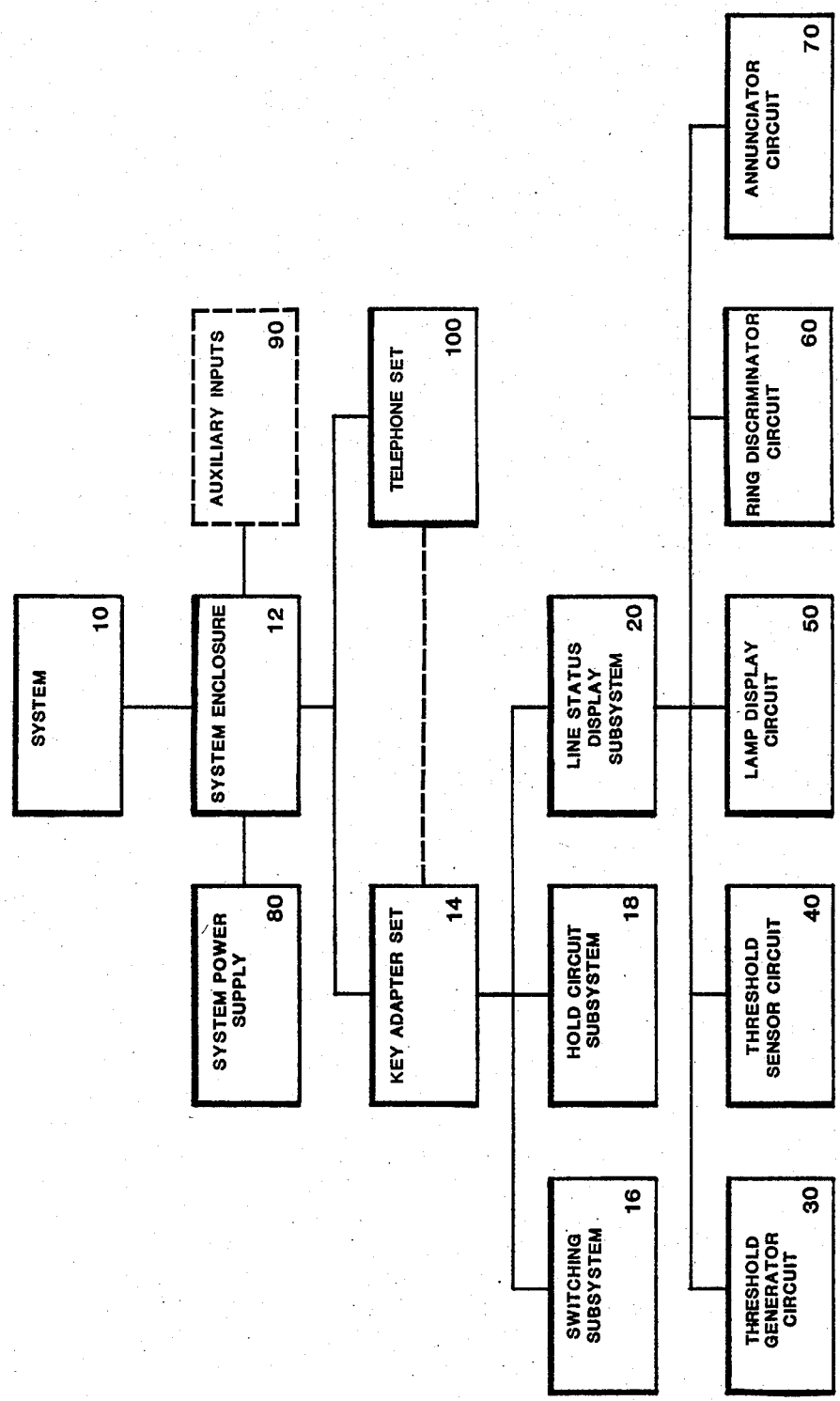
FIG. 4 is a indentured system block diagram.

The preferred embodiment of the system 10, as shown in FIG. 4, is comprised of four major elements: a system enclosure 12, a key adapter set 14, a system power supply 80 and an integral DTMF telephone set 100. The key adapter set 14 is comprised of three subsystems: a switching subsystem 16, a hold circuit subsystem 18 and a line-status display subsystem 20. The line-status display subsystem 20 is further comprised of five circuits: a threshold generator 30; a threshold sensor 40; a lamp display 50; a ring discriminator 60; and an annunciator 70.

The system enclosure 12, as best shown in FIG. 1, serves as the housing for the system. The enclosure in the preferred embodiment includes an integral DTMF telephone set 100 and the key adapter set 14. In the second embodiment as shown in FIG. 2, the telephone set 100 is a separate element that is connected to the key adapter set 14 by means of a standard telephone cable and jack.

All references to the telephone set 100 implies usage of only the speech circuit elements of a single-line telephone subscriber set. Additionally, although the preferred embodiment uses a DTMF telephone set, a rotary dialing telephone as well as other types of tone signalling sets and the d-c pushbutton system used by Deutche Bundesport may also be used by implementing additional circuits that are well known in the art.

The system power supply 80 may be of any design and configuration suitable for the application. The only requirement is that the power supply provide the system 10 with required voltages and current levels. A typical block diagram of the system power supply is shown in FIG. 15.

The preferred embodiment employs an a-c power adapter module 82, as shown in FIGS. 1 and 15, that incorporates an a-c to d-c power converter and serves as a junction-conduit for the telephone lines by including two RJ14C telephone jacks. Each jack accommodates two telephone lines. Thus, with this arrangement only one cable assembly 13 need be connected to the system enclosure 12 since the cable carries both the power and the telephone lines to the adapter 82. The adapter plugs into a public utility a-c receptacle and the telephone lines are routed from the adapter to the telephone utility jacks supplying the telephone lines from the telephone central office.

A back-up electrical power system may also be included that allows the system 10 to operate and line status LED's to illuminate if the a-c power source should fail. The back-up system operates on a standard 9-volt battery housed and electrically connected within the system enclosure. The circuit for this back-up system is well known in the art and is therefore not described.

Figure 5:
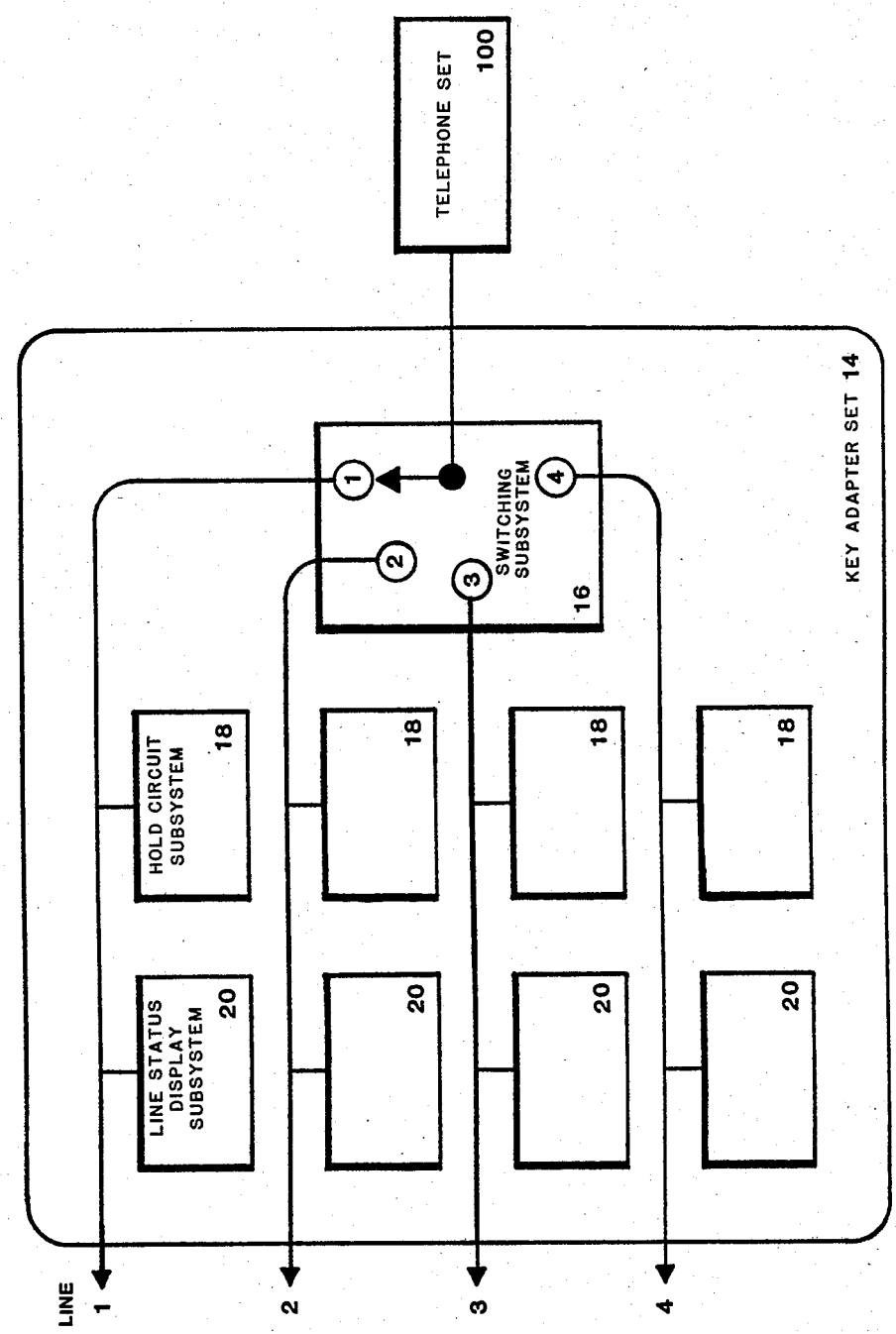
FIG. 5 is a block diagram of a key adapter set and its major subsystems.

The key adapter set 14, which forms the nucleus of the system and includes the inventive elements of the design, is shown in block diagram form in FIG. 5. As previously mentioned the key adapter set 14 is comprised of a switching subsystem 16, a hold circuit subsystem 18 and a line-status display subsystem 20.

The switching subsystem 16 allows the user to connect and switch the telephone set 100 to any of the four telephone lines connected to the system and/or to transfer any of the lines to a line-hold status.

Figure 6:
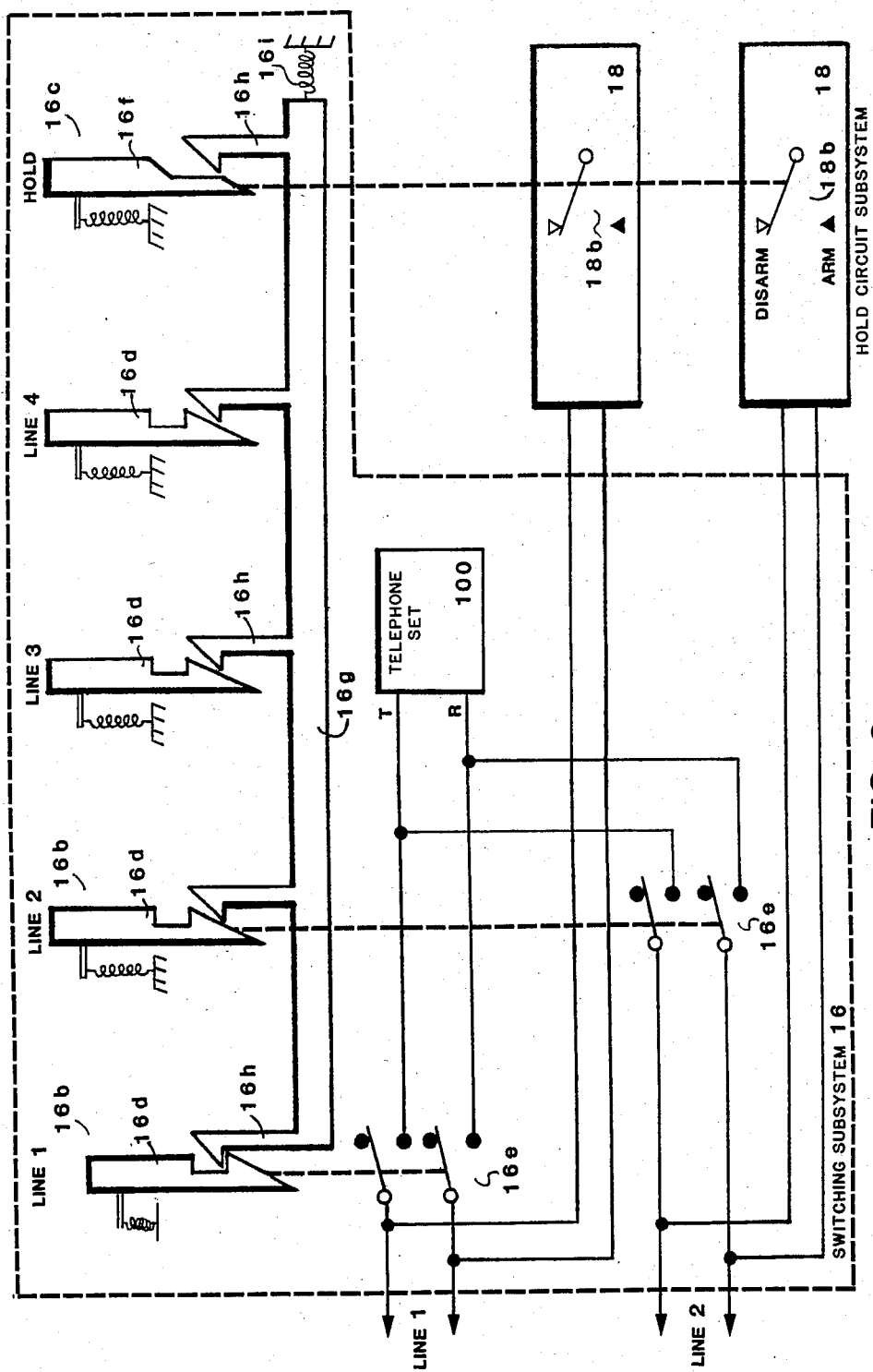
FIG. 6 is a schematic of the switching subsystem.

As shown schematically in FIGS. 5 and 6, the subsystem 16 is mechanical and is comprised of a five-section pushbutton assembly. Four of the sections are telephone line sections 16b which are used to activate the telephone line while the fifth section is a telephone line hold section 16c that is used to place any of the active telephone lines on a hold status. Each of the four telephone line sections is operated by a telephone line pushbutton 16d that is mechanically and integrally connected to a line-connect switch 16e. The telephone line hold section 16c is operated by a hold pushbutton 16f. Common to all the pushbuttons is a switch latching bar 16g that includes five vertical sections 16h.

The four telephone line pushbuttons 16d, as shown in FIG. 6, are spring-loaded mechanical latching switches that when pressed latch to the vertical section 16h of the switch latching bar 16g. The latching bar has a spring loaded end 16i that allows the bar to move laterally and lock the pushbutton to the vertical section 16h when a pushbutton is pressed. To release the pushbutton, pressing any button causes the bar 16g to again move laterally and release the pushbutton. In FIG. 6, a switch in the locked position is illustrated for line number one while line number two shows a switch in the unlocked position. The single hold pushbutton 16f is configured as a non-latching (momentary) switch as shown in FIG. 6. The design of this switch ensures that the "arming" of the hold circuit subsystem 18, described infra, is complete at the time the telephone load holding the selected telephone line is released.

Each telephone line pushbutton 16d is mechanically linked to the poles of a double-pole double-throw switch referred to as the line-connect switch 16e. The poles of each switch are connected to the respective Ring and Tip lines coming onto the system 10 from the telephone central office and to the output of the hold circuit subsystem 18 that activates the hold load 18c into the telephone circuit when the hold button 16f is pressed. The normally open contacts of the switch are connected to the respective Ring and Tip lines connected to the telephone set 100. To prevent an unexpected line transient in an unused telephone line from closing the electronic switch 18a, located in the hold circuit subsystem 18, the normally open (unused) contact of switch 16e may be connected to the control gate G of the switch 18a. Under this circuit configuration the switch 16e in the unused line maintains the gate of the switch 18a in a shorted condition which, in turn, inhibits the switch 18a from transitioning into conduction.

Figure 7:
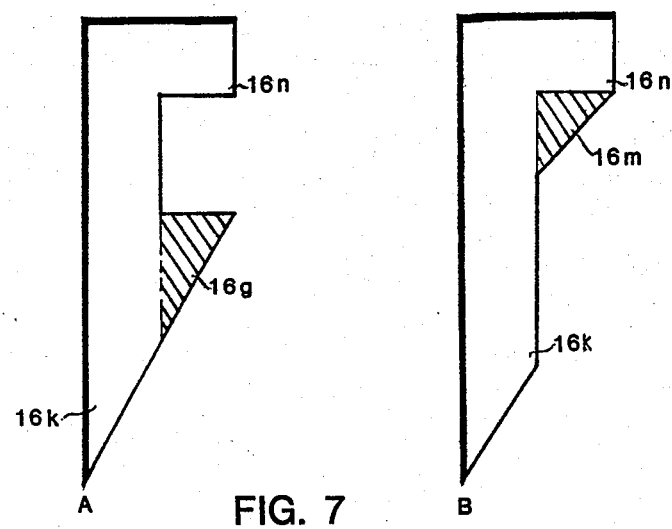
FIG. 7 is a plan view of the modified hold pushbutton showing the addition of a camming slope and a straight shaft.

The five section pushbutton assembly 16 may consist of a new design as described above; or a typical pushbutton assembly such as a PBS series switch manufactured by Centralab, Incorporated of Indiana, United States of America may be used with the addition of a novel modification. This modification as best shown in FIGS. 7A and 7B entails removing the lower latching camming slope 16g from the switch post 16k and adding an override camming slope 16m to the upper latch section 16n. The modification ensures that the hold circuit subsystem 18 is "armed" at the time the latched telephone line is released to be placed in a hold status as explained below. This feature whether it be in a new or modified design prevents an inadvertent loss of the telephone line connection and allows a smooth transition into the line hold state.

The hold circuit subsystem 18 allows a busy telephone set 100 to be temporarily disconnected from the telephone line by placing the line on a hold status. This function is accomplished by switching onto the line a hold load that simulates a telephone off-hook condition, thus keeping the busy line active but muted. After the hold circuit is enabled the user may switch to another line to conduct a second conversation or converse with another person in the vicinity of the telephone set without the conversation being heard by the person holding on the muted line.

Figure 8:
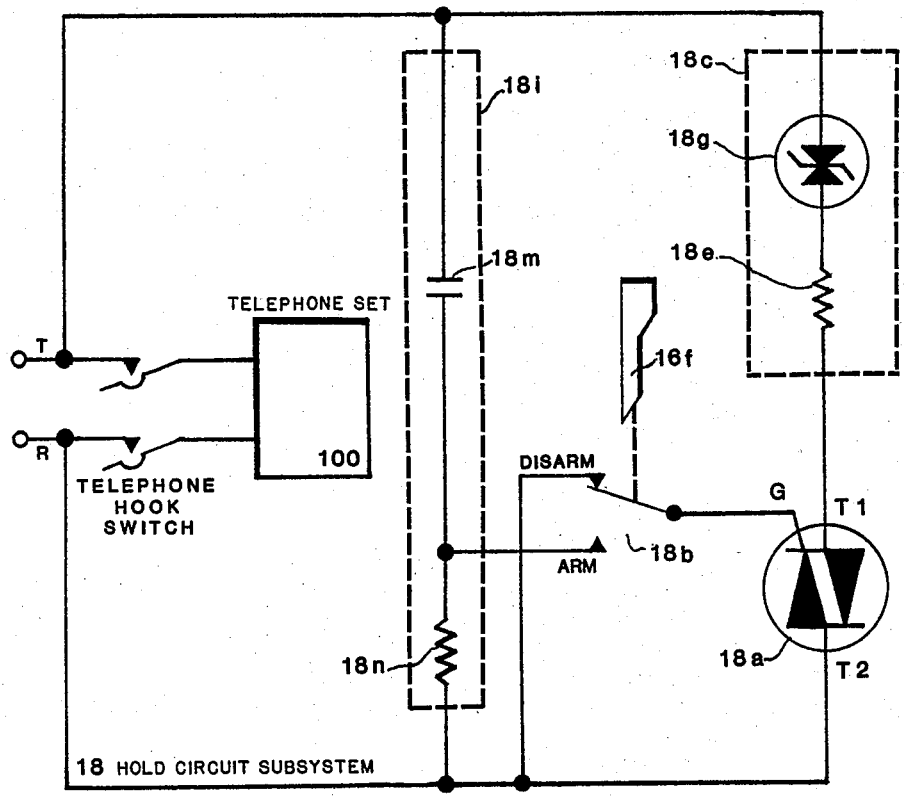
FIG. 8 is a schematic of the hold circuit subsystem.

The hold circuit 18, as shown in FIG. 8, is comprised of four major elements: a thyristor that functions as an electronic switch 18a; a single-pole double-throw switch, referred to as a disarm/arm switch 18b, that controls the triggering sensitivity of the electronic switch 18a; a hold load 18c that maintains the telephone line under load when the electronic switch 18a is conducting; and a firing network 18i that a-c couples transients on the telephone line to trigger the electronic switch into conduction when the circuit is "armed" by the disarm/arm switch 18b.

As shown in FIG. 8, the hold circuit 18 is in parallel with any load provided by the telephone set 100. Under a line busy condition (hold pushbutton 16f not depressed) the control electrode G of switch 18a is connected to its main electrode T₂ through the normally closed "disarm" contact of switch 18b. Under this shorted condition, the electronic switch 18a will not initiate conduction.

The T₂ and DISARM contact junction is also connected to the Ring lead and the resistive end of the firing network 18i. The electrode T₁ of the switch 18a is connected to the Tip lead by way of the hold load 18c.

To connect the hold load 18c onto the circuit, the hold pushbutton 16f is pressed. When the switch has traveled to approximately 80 percent of its total excursion, the contact arm of switch 18b is moved to the ARM position. In this position, the electrode G of switch 18a is placed at the junction 18j of the firing network 18i in parallel with voltage stabilizing resistor 18n. At this point, the telephone load is still in the circuit.

When the hold pushbutton 16f completes its total excursion three interrelated events occur: (a) the telephone set load is mechanically disconnected by unlatching the telephone line pushbutton 16d in the pushbutton assembly 16a, (b) a transient, resulting from the load disconnection, is developed at the telephone line and junction 18j of the firing network, and (c) the resulting transient current is applied to control electrode G of the switch 18a which causes the switch 18a to conduct which, in turn, allows the hold load 18c to be connected onto the telephone line. The hold load replaces the telephone load and thus, maintains the line capture.

Note that capacitor 18m will always charge to the line voltage between the Tip and Ring leads and thereafter, as long as that voltage remains constant, no current flows in voltage stabilizing resistor 18n nor, as a consequence, in the ARM contact of switch 18b and control electrode G of the electronic switch 18a.

The disarm/arm switch 18b as described above may also be comprised of a switch bank having a ganged plurality of poles. In this configuration, each of the poles controls two contacts and the poles are mechanically linked to the hold pushbutton 16f of the switching subsystem 16.

The hold load, as shown in FIG. 8, may consist solely of resistor 18e. In this case, the value of the resistance must be chosen to comply with two conditions: (a) when the telephone load (usually 200 to 400 ohms) is in parallel, the share of current available to the hold circuit 18 is less than minimum to maintain conduction in the electronic switch 18a; and (b) when the resistive load is the only load on the line, it must draw more current than the minimum necessary to maintain the connection at the central telephone office. A balance of these conflicting conditions often can be achieved but optimization varies with the distance from the central office, and therefore with the line resistance.

The hold load 18c may also be comprised solely of a nonlinear device such as a double zener diode 18g or a single zener diode (not shown). Choice of the zener voltage to be equal to or greater than the voltage drop across the telephone load connected to the line will ensure that the share of current available to the electronic switch 18a will be insufficient to maintain conduction when the telephone load is paralleled across the line.

Combinations of linear and nonlinear load elements can also be used and are preferred. For example: if resistance 18e is 200 ohms and the nonlinear load is a 15-volt double anode zener diode, 18g, as shown in FIG. 8, then the voltage across the line in the hold condition will always be distinguishably larger than it is when loaded by a 200 ohm telephone set alone. This characteristic difference in line voltage can be used as a supervisory signal distinguishing "hold" from "busy" conditions.

Also note that the hold circuit 18 does not require that the hold current be in a preferred direction. The circuit will perform its function with current flow in either direction; additionally, the actuation of the disarm/arm switch 18b will not initiate flow of hold current if the line is already in the idle state, or if another termination remains across the line. Obviously, components that require a preferred direction of current flow such as zener diodes and electronic switches may be used if a polar guard (bridge) is employed to connect the telephone lines.

The line status display subsystem 20 constantly monitors and displays the status of each line coming into the system 10 for idle, ringing, busy or holding. The subsystem 20 is comprised of five major circuits: a threshold generator 30, a threshold sensor 40; a lamp display 50; a ring discriminator 60 and an annunciator 70.

The decision making process is covered in detail in the threshold sensor circuit 40 described infra.

The threshold generator 30, as shown in FIG. 9 establishes and provides a threshold reference offset voltage $V_o$ between the negative pole of the system power supply 80 and earth ground. The generator 30 and the voltage $V_o$ is used in combination with the threshold sensor 40 to sense the telephone line voltage $V_L$. The voltage $V_L$, as shown nearest FIG. 10, is measured between the more positive of the telephone line conductors and earth ground and varies in accordance with the status of the telephone line. When the line is IDLE, $V_L$ is at approximately 0-volts; when the line is on HOLD, $V_L$ is at a negative voltage with respect to earth ground; and when the line is BUSY (telephone OFF hook), $V_L$ is at a more negative voltage than when the line is on HOLD. Thus, the status of the line is sensed by determining if $V_L$ is above or below a selectable threshold voltage $V_T$. The voltage $V_T$ is selected to represent the boundary between the $V_L$ values present when the line is in an IDLE, HOLD or BUSY condition.

The offset voltage $V_o$ is set to equal the sum of $V_T$ with respect to earth ground plus the gate input offset where the offset is the input value with respect to circuit ground at which the gate output changes state. Note, that the relative polarity of the telephone line is not important since the more negative of the lines with respect to earth ground does not affect the operation of the gate 40a.

The offset voltage $V_o$ is alternatively switched between two values, $V_{01}$ and $V_{02}$, at the frequency set by the wink-rate oscillator 32. These values correspond to the values of $V_{T1}$ and $V_{T2}$ of the threshold voltage $V_T$, and correspond to the values of $V_T$ required to make an IDLE/NOT-IDLE decision and a BUSY/NOT-BUSY decision.

The threshold generator circuit, as shown in FIG. 9, is one possible circuit configurations that may be employed to establish the threshold voltage levels. In this embodiment, the generator is comprised of the wink-rate oscillator 32, a resistive load network 36, a constant current diode 38, and an NPN transistor 34. The network 36 establishes the required threshold voltage trigger points for the threshold voltage sensor 40. These trigger points are established by the controlled current and the total resistance of the network. The network includes an upper resistor 36a, a lower resistor 36b and a trim rheostat 36c that allows the voltages across the network to be set to the required levels. The upper end of the network is connected to earth ground while the lower end to circuit ground.

Earth ground is by definition at a zero earth-referenced potential from the geologic earth. The circuit ground terminology denotes the circuit power supply reference node through which all power supply load loop currents return to the supply. The potential difference between earth ground and circuit ground is the voltage drop across the resistive load network 36 created by the power supply current loop.

The constant current diode 38 is connected to regulate the current between the power supply output $V_H$ and the junction of the network 36 with earth ground. $V_H$ is a positive voltage with respect to circuit ground and is normally higher than $V_{DD}$.

The wink-rate oscillator 32 in the preferred embodiment, is comprised of two CMOS 2-input NOR digital logic gates coupled to an RC time delay loop 32a that is designed to oscillate at a low frequency of 2 Hertz. There are many possible alternative oscillator configurations including a single saturated inverter with a time delay on its recovery time.

The oscillator is resistively coupled to and drives the base of transistor 34 whose collector-emitter junction is across resistor 36b of the resistive load network 36. This circuit configuration allows the transistor 34 to be switched ON and OFF at the established wink rate thus, modulating the effective total resistance in the network. In turn, this modulation shifts the threshold reference voltage by an IR drop across the lower resistor 36b.

The resistance of coupling resistor 33 is selected to assure that the transistor 34 operates in only two states: saturated when ON and cut-off when OFF. When the transistor is OFF a typical reference voltage between circuit ground and earth ground of $V_{02}$ volts d-c is provided across the network 36; when the transistor is ON the reference voltage drops to a smaller voltage $V_{01}$.

Alternative methods of generating and controlling the voltages $V_{01}$ and $V_{02}$ can include similar or equivalent switching of zener voltage drops or diode clamping networks but, as illustrated by the rheostat 36c of FIG. 9, a trimming adjustment available to the system user can optimize the decision thresholding for variations in installation conditions such as the local telephone utility's battery voltage or distance dependent telephone line resistance.

The system 10 requires that a threshold sensor circuit 40 be included for each line connected to the system 10. However, for the purposes of explanation, only one circuit is necessary and therefore, only one is shown in FIG. 11. The sensor essentially compares the telephone line voltages to the offset voltages ($V_o$) that is referenced to earth ground. This voltage has predictable relationships to the telephone line states. Thus, the variations in $V_o$ permits comparison decisions to be made with respect to the various line states.

Each sensor circuit is comprised of a 2-input NOR gate 40a, and an R-C coupling network consisting of two high resistance resistors 40b, 40c and two capacitors 40d, 40e. The resistors isolate the gate inputs from the environment while the capacitors, in conjunction with the resistors, provide delays which attenuate waveforms, that may be caused by lightning or other transient conditions, to levels that are tolerable by the gate 40a. In the preferred embodiment, the gate is one of four gates included in a typical QUAD 2-input NOR gate circuit. CMOS technology is preferred for the system 10 circuits because of its extremely low input current requirements and the superior isolation characteristics of the inputs. Additionally, the use of a two-input NOR gate permits telephone line state detection to be independent of the polarity of the telephone line Tip or Ring leads with respect to each other. If other means of polarity independence, such as a polarity guard are provided, a single input device can be used.

The power for the circuit is a combination voltage derived from the circuit power supply 80 that provides $V_{DD}$ and the threshold offset voltage $V_o$ from the threshold generator 30. $V_o$ as previously mentioned is the voltage differential between earth ground and circuit ground.

The output from the gate 40a of the threshold sensor 40 is either in a "high" or a "low" state with respect to circuit ground. The "low" output corresponds to a telephone line idle condition while the "high" to a not-idle condition. A better understanding of the sensor circuit 40 can best be gleened by referring to FIG. 10 which illustrates the essential elements of a typical telephone line loop. As shown in the figure, if the telephone load ($R_T$) is the only load on the line, in the idle state (telephone on-hook or "no load current") the tip and ring subscriber terminals are at approximately zero volts and open circuit telephone battery voltage ($V_b$) respectively, with respect to earth ground. To make an IDLE/NOT-IDLE decision on the state of the telephone line, it is only necessary to ascertain that the tip terminal is not more negative with respect to earth ground than the voltage associated with no current flow.

If the voltage offset $V_o$ is adjusted to establish circuit ground at a potential of $V_{DD}$ negative with respect to earth ground, earth potential at either of the sensor 40 inputs will produce a logic "low" output. Thus, a low sensor output is indicative of a telephone line in the IDLE state. Conversely, upon the application of a load to the telephone line, which occurs when the telephone is taken off-hook, current flows and the tip terminal sees a voltage more negative than earth ground. Thus, the gate 40a goes to a "high" state which is indicative of a telephone line in the NOT-IDLE state.

The sensitivity of this transition will be determined by the characteristics of the logic device and the values of $V_{DD}$ and $V_o$ as well as the parameters of the telephone loop. However, the change in voltage drop across a telephone line between the IDLE and BUSY states is typically many times the change required in the gate 40a input voltage to change the state of the logic output and the threshold reference voltage may be coarsely positioned at a value representing the division between the two telephone line states.

As shown in FIG. 10, the ring terminal will always be more negative than the tip terminal. Therefore, it will have no influence on decisions based on the more positive terminal. However, if terminal polarity is in doubt, this configuration ensures that decisions are based on the more positive of the terminals regardless of their designations as ring or tip leads.

For given conditions of central office battery voltage and loop length, the current induced voltage at the tip lead will vary with the resistance and/or voltage drop characteristics of the load applied. Specific conditions of higher or lower current loads will be indicated by the sensor 40 output state being low or high according to whether the voltage differential between the most positive terminal and $V_o$ is sufficient to cause a lower output. Appropriate choice of $V_o$ can be used to discriminate among loads drawing higher or lower currents from the line (corresponding to lower or higher earth ground referenced voltages on the tip terminal).

By varying values of $V_o$ the threshold sensor 40 can be used to make more than one decision. For example: a low value of offset voltage $V_{01}$ can be used to make an IDLE/NOT-IDLE decision (zero/not-zero voltage on the tip terminal) and a larger value of offset voltage $V_{02}$, can be used to distinguish between a telephone set load (logic low output) and some lighter or lower current load (logic high output). If a third state, such as a "HOLD" state, is established with an alternate load which draws more current than the IDLE state but less current than a telephone in the BUSY state, then combinations of two-state decisions based separately on the $V_{01}$ and $V_{02}$ voltage offsets can be used to distinguish among the three states of IDLE, BUSY, or HOLD according to the following truth table:

| STATE OF LINE | $V_{01}$ DECISION | $V_{02}$ DECISION | LED |
|---|---|---|---|
| IDLE | Low or Idle | Low or Not-Busy | Off |
| BUSY | High or Not-Idle | High or Busy | On |
| HOLD | High or Not-Idle | Low or Not-Busy | Wink* |

*Winks On and Off at the frequency of the wink-rate oscillator.

The output of the sensor 40 is applied to the input of the lamp display circuit 50 which is comprised, as shown in FIG. 12 of a NPN transistor 50a that drives an LED 50b connected to $V_{DD}$ through resistor 50c. The use of transistor 50a is optional but preferred. The transistor increases the current from the gate 40a to allow the LED to have a brighter illumination. The lamp display includes an LED for each of the telephone lines. If $V_o$ is shifted cyclically between the values of $V_{01}$ and $V_{02}$ at the rate of the wink-rate oscillator 32 the LED 50b will illuminate when the sensor output is high thus will: be dark in the IDLE state, light in the BUSY state; and turn ON and OFF at the wink-rate in the HOLD state.

The output of the NOR gate 40a, in addition to driving the base circuit of the lamp display transistor 50a is also applied to the input of the ring discriminator 60.

The Ring discriminator 60 is optional but preferred. If a discriminator is not used, the output from the NOR gate 40a in the threshold sensor circuit 40 may be capacitively coupled directly to the input of the annunciator 70 through capacitor 70a as shown in FIGS. 13 and 14.

Referring to FIGS. 11, 12 and 13, when the signal from the threshold sensor 40 is in the Idle or Busy state, it is in a steady high or low state respectively. In the Hold state, the signal alternates between high and low states at the rate set by the wink-rate oscillator 32 in the threshold generator 30. During ringing bursts when the telephone line is being called, the signal will have a train of pulses at the frequency of the ringing signal applied to either or both of the ring and tip leads. These pulses cause the LED 50b to "flutter" in bursts and they may be applied to the annunciator 70, via the discriminator 60 or directly, for audible annunciation of the ringing state.

The annunciator 70 shown in FIG. 13 is gating on and off a tone generator in the region of 2 kHz. In the absence of an intercom, this modulated chirp can drive a small speaker within the housing to alert a user to an incoming call. Where intercom is available, the chirp signal can be simply coupled to the intercom's existing speaker. The annunciator circuit or derivations of the circuit are well known in the art, therefore, it is not described.

The discriminator, as shown in FIG. 13, is a form of staircase detector with a controlled decay rate. The short time constant, T1, of the a-c coupling high pass network, comprised of resistor 60c and capacitor 60b, will differentiate low frequencies into a series of positive charging spikes. Diode 60e provides d-c restoration and suppression of negative spikes.

Diode 60f acts as a switch to permit capacitor 60g to charge whenever the voltage across resistor 60c exceeds the voltage on capacitor 60g. The time constant T2 provided by the low pass network of resistor 60h and capacitor 60g where (60i>>60h) is too long to allow a single charging spike to raise capacitor 60g to a gate triggering voltage. If succeeding positive pulses arrive before the charge on 60g has drained off thru 60i, an additional charge increment will be added. As the charge on capacitor 60g increases, the charge increments become smaller since they are a function of the difference between the voltages across the resistor 60c and capacitor 60g and the peak at 60c is fixed.

If the frequency of pulses is rapid enough, capacitor 60g will reach gate opening voltage after a certain number of pulses have been applied. When the NAND gate 60a first input attached to capacitor 60g becomes true, then the same pulses applied to the second NAND gate input will be passed to the output and on to the annunciator 70.

The time constants T1 and T2 can be chosen to select the minimum number of pulses at a ringing frequency that must occur before one is passed to the annunciator. At lower frequencies, longer burst durations are required or steady state equilibrium may be reached with capacitor 60g peaking at a voltage insufficient to open the gate. Random noises and wink-rate signals do not have the regularity necessary to build sufficient charge in capacitor 60g.

While the invention has been described in complete detail and pictorially shown in the accompanying drawings, it is not to be limited to such details, since many changes and modifications may be made to the invention without departing from the spirit and the scope thereof. For example, the system may also include an adjustable ringer-volume control, and a standard modular jack that serves as an auxiliary input 90 that allows the connection of an auto-dialer, a speaker phone or other available telephone accessories. The interfacing circuits for these devices are well known in the art and are therefore, not described. Hence, the invention is described to cover any and all modifications and forms which may come within the language and scope of the claims.

I claim:

1. A stand-alone keyphone system comprising:
A. a telephone set,
B. a key adapter set integrally connected to said telephone set where said key adapter set comprises:
   (1) a switching subsystem further comprising:
      (a) a mechanically latched pushbutton assembly further comprising:
         (1) a plurality of telephone line pushbuttons that provide the means to allow said telephone set to be connected to any of the telephone lines connected to said system,
         (2) a hold pushbutton section that when pressed, disconnects said telephone set load from the circuit and connects a hold load onto the circuit that places the selected telephone line in a hold status, where said hold pushbutton section includes a non-latching straight post having an upper override camming slope extending outwardly from upper part of said post,
      (b) a telephone line connect switch connected to each telephone line where switch is mechanically linked and actuated by the respective said telephone pushbutton where when said switch is closed by said telephone pushbutton an electrical contact is made that allows said telephone set to be connected to the corresponding telephone line,
   (2) a plurality of hold circuit subsystem means where each of said hold circuit subsystem means allows said telephone set to be temporarily disconnected from the telephone line selected by said switching means,
   (3) a line status display subsystem means that monitors and displays the status of each of said telephone lines connected to said key adapter set, and
C. a system power supply having means to supply said system with required voltages and currents.

2. A stand-alone keyphone system comprising:
A. a telephone set,
B. a key adapter set integrally connected to said telephone set where said key adapter set further comprises:
   (1) a switching subsystem means that allows said telephone set to be connected and switched to a plurality of telephone lines connected to said key adapter set and/or to transfer any of the lines to a hold status wherein said switching subsystem comprises:
      (a) a mechanically latched pushbutton assembly further comprising:
         (1) a plurality of telephone line pushbuttons that provide the means to allow said telephone set to be connected to any of the telephone lines connected to said system,
         (2) a hold pushbutton section that when pressed, disconnects said telephone set load from the circuit and connects a hold load onto the circuit that places the selected telepone line in a hold status, wherein said pushbutton section is a modified PBS series switch where the modification comprises:
            (a) removing the lower latching camming slope from the switch post,
            (b) adding an override camming slope to the upper latch section,
   (2) a plurality of hold circuit subsystem means where each of said hold circuit subsystem means allow said telephone set to be temporarily disconnected from the telephone line selected by said switching means,
   (3) a line status display subsystem means fhat monitors and displays the status of each of said telephone lines connected to said key adapter set, and
C. a system power supply having means to supply said system with required voltages and currents.

3. A stand-alone keyphone system comprising:
A. a telephone set,
B. a key adapter set integrally connected to said telephone set where said key adapter set comprises:
   (1) a switching subsystem means that allows said telephone set to be connected and switched to a plurality of telephone lines connected to said key adapter set and/or to transfer any of the lines to a hold status,
   (2) a plurality of hold circuit subsystem means where each of said hold circuit subsystem means allows said telephone set to be temporarily disconnected from the telephone line selected by said switching means, wherein each of said hold circuit subsystem means comprises:
      (a) an electronic switch having a control electrode and two functional states: a nonconducting state and a conducting state where the conducting state is initiated by a current applied through the control electrode,
      (b) a hold load connected in series with said electronic switch where said load is disconnected from the telephone line when said electronic switch is in the nonconducting state and connected across the telephone line when said electronic switch is in the conducting state,
(c) a firing network connected across the telephone line where said network serves as a coupling means for a line transient that is produced when said telephone load is disconnected by said switching subsystem means,
(d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected,
(3) a line status display subsystem means that monitors and displays the status of each of said telephone lines connected to said key adapter set, and
C. a system power supply having means to supply said system with required voltages and currents.

4. A stand-alone keyphone system comprising:
A. a telephone set,
B. a key adapter set integrally connected to said telephone set where said key adapter set further comprises:
(1) a switching subsystem means that allows said telephone set to be connected and switched to a plurlaity of telephone lines connected to said key adapter set and/or to transfer any of the lines to a hold status,
(2) a plurality of hold circuit subsystem means where each of said hold circuit subsystem means allows said telephone set to be temporarily disconnected from the telephone line selected by said switching means, wherein each of said hold circuit subsystem means comprises:
(a) an electronic switch having a control electrode and two functional states: a nonconducting state and a conducting state where the conducting state is initiated by a current applied through the control electrode, wherein said electronic switch is comprised of a thyristor or other such device which can perform a nonconductive current blocking function or a conductive switching function when either of the thyristor electrodes T1 or T2 is at a positive potential with respect to the other,
(b) a hold load connected in series with said electronic switch where said load is disconnected from the telephone line when said electronic switch is in the nonconducting state and connected across the telephone line when said electronic switch is in the conducting state,
(c) a firing network connected across the telephone line where said network serves as a coupling means for a line transient that is produced when said telephone load is disconnected by said switching subsystem means,
(d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected,
(3) a line status display subsystem means that monitors and displays the status of each of said telephone lines connected to said key adapter set, and
C. a system power supply having means to supply said system with required voltages and currents.

5. A stand alone keyphone system comprising:
A. a telephone set,
B. a key adapter set integrally connected to said telephone set where said key adapter set comprises:
(1) a switching subsystem means that allows said telephone set to be connected and switched to a plurality of telephone lines connected to said key adapter set and/or to transfer any of the lines to a hold status,
(2) a plurality of hold circuit subsystem means where each of said hold circuit subsystem means allows said telephone set to be temporarily disconnected from the telephone line selected by said switching means, wherein each of said hold circuit subsystem means comprises:
(a) an electronic switch having a control electrode and two functional states: a nonconducting state and a conducting state where the conducting state is initiated by a current applied through the control electode,
(b) a hold load connected in series with said electronic switch where said load is disconnected from the telephone line when said electronic switch is in the nonconducting state and connected across the telephone line when said electronic switch is in the conducting state,
(c) a firing network connected across the telephone line where said network serves as a coupling means for a line transient that is produced when said telephone load is disconnected by said switching subsystem means, wherein said firing network is comprised of a capacitor in series with a resistor where the line transient is coupled from the capacitor-resistor junction of said firing network through the arm position of said disarm/arm switch to the control gate on said electronic switch,
(d) a disarm/arm switch connected between said firing network and said electonic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected, (3) a line status display subsystem means that monitors and displays the status of each of said telephone lines connected to said key adapter set, and C. a system power supply having means to supply said system with required voltages and currents.

6. A stand-along keyphone system comprising:
A. a telephone set,
B. a key adapter set integrally connected to said telephone set where said key adapter set comprises:
  (1) a switching subsystem further comprising:
    (a) a mechanically latched pushbutton assembly further comprising:
      (1) a plurality of telephone line pushbuttons that provide the means to allow said telephone set to be connected to any of the telephone lines connected to said system,
      (2) a hold pushbutton section that when pressed, disconnects said telephone set load from the circuit and connects a hold load onto the circuit that places the selected telephone line in a hold status, where said hold pushbutton section includes a non-latching straight post having an upper override camming slope extending outwardly from upper part of said post,
    (b) a telephone line connect switch connected to to each telephone line where switch is mechanically linked and actuated by the respective said telephone pushbutton where when said switch is closed by said telephone pushbutton an electrical contact is made that allows said telephone set to be connected to the corresponding telephone line,
  (2) a plurality of hold circuit subsystem means where each of said hold circuit subsystem means allows said telephone set to be temporarily disconnected from the telephone line selected by said switching means, wherein each of said hold circuit subsystem means comprises:
    (a) an electronic switch having a control electrode and two functional states: a nonconducting state and a conducting state where the conducting state is initiated by a current applied through the control electrode,
    (b) a hold load connected in series with said electronic switch where said load is disconnected from the telephone line when said electronic switch is in the nonconducting state and connected across the telephone line when said electronic switch is in the conducting state,
    (c) a firing network connected across the telephone line where said network serves as a coupling means for a line transient that is produced when said telephone load is disconnected by said switching subsystem means,
    (d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electonics switch which causes said electronic switch to conduct which in turn connects said hold load onto the hold circuit at the time the telephone load is disconnected, wherein said disarm/arm switch is comprised of a switch back having a ganged plurality of poles where each pole controls two contacts and where said hold pushbutton is mechanically connected to each of said poles,
  (3) a line status display subsystem means that monitors and displays the status of each of said telephone lines connected to said key adapter set, and
C. a system power supply having means to supply said system with required voltages and currents.

7. A stand alone keyphone system comprising:
A. a telephone set,
B. a key adapter set integrally connected to said telephone set where said key adapter set comprises:
  (1) a switching subsystem means that allows said telephone set to be connected and switched to a plurality of telephone lines connected to said key adapter set and/or to transfer any of the lines to a hold status,
  (2) a plurality of hold circuit subsystem means where each of said hold circuit subsystem means allows said telephone set to be temporarily disconnected from the telephone line selected by said switching means, wherein each of said hold circuit subsystem means comprises:
    (a) an electronic switch having a control electrode and two functional states: a nonconducting state and a conducting state where the conducting state is initiated by a current applied through the control electrode,
    (b) a hold load connected in series with said electronic switch where said load is disconnected from the telephone line when said electronic switch is in the nonconducting state and connected across the telephone line when said electronic switch is in the conducting state,
    (c) a firing network connected across the telephone line where said network serves as a coupling means for a line transient that is produced when said telephone load is disconnected by said switching subsystem means,
    (d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected, where further travel of the pole of said disarm/arm switch after the pole has reached the arm state unlatches the selected telephone lines to thus cause hold triggering transient,
  (3) a line status display subsystem means that monitors and displays the status of each of said telephone lines connected to said key adapter set, and
C. a system power supply having means to supply said system with required voltages and currents.

8. A stand-alone keyphone system comprising:
A. a telephone set,

B. a key adapter set integrally connected to said telephone set where said key adapter set further comprises:
  (1) a switching subsystem means that allows said telephone set to be connected and switched to a plurality of telephone lines connected to said key adapter set and/or to transfer any of the lines to a hold status,
  (2) a plurality of hold circuit subsystem means where each of said hold circuit subsystem means allows said telephone set to be temporarily disconnected from the telephone line selected by said switching means, wherein each of said hold circuit subsystem means comprises:
    (a) an electronic switch having a control electrode and two functional states: a nonconducting state and a conducting state where the conducting state is initiated by a current applied through the control electrode,
    (b) a hold load connected in series with said electronics switch where said load is disconnected from the telephone line when said electronic switch is in the nonconducting state and connected across the telephone line when said electronic switch is in the conducting state, where said hold load is comprised of a resistor,
    (c) a firing network connected across the telephone line where said network serves as a coupling means for a line transient that is produced when said telephone load is disconnected by said switching subsystem means,
    (d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected,
  (3) a line status display subsystem means that monitors and displays the status of each of said telephone lines connected to said key adapter set, and
C. a system power supply having means to supply said system with required voltages and currents.

9. A stand-alone keyphone system comprising:
A. a telephone set,
B. a key adapter set integrally connected to said telephone set where said key adapter set further comprises:
  (1) a switching subsystem means that allows said telephone set to be connected and switched to a plurality of telephone lines connected to said key adapter set and/or to transfer any of the lines to a hold status,
  (2) a plurality of hold circuit subsystem means where each of said hold circuit subsystem means allows said telephone set to be temporarily disconnected from the telephone line selected by said switching means, wherein each of said hold circuit subsystem means comprises:
    (a) an electronic switch having a control electrode and two functional states: a nonconducting state and a conducting state where the conducting state is initiated by a current applied through the control electrode,
    (b) a hold load connected in series with said electronics switch where said load is disconnected from the telephone line when said electronic switch is in the nonconducting state and connected across the telephone line when said electronic switch is in the conducting state, where said hold load is comprised of a nonlinear device,
    (c) a firing network connected across the telephone line where said network serves as a coupling means for a line transient that is produced when said telephone load is disconnected by said switching subsystem means,
    (d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected,
  (3) a line status display subsystem means that monitors and displays the status of each of said telephone lines connected to said key adapter set, and
C. a system power supply having means to supply said system with required voltages and currents.

10. A stand-alone keyphone system comprising:
A. a telephone set,
B. a key adapter set integrally connected to said telephone set where said key adapter set further comprises:
  (1) a switching subsystem means that allows said telephone set to be connected and switched to a plurality of telephone lines connected to said key adapter set and/or to transfer any of the lines to a hold status,
  (2) a plurality of hold circuit subsystem means where each of said hold circuit subsystem means allows said telephone set to be temporarily disconnected from the telephone line selected by said switching means, wherein each of said hold circuit subsystem means comprises:
    (a) an electronic switch having a control electrode and two functional states: a nonconducting state and a conducting state where the conducting state is initiated by a current applied through the control electrode,
    (b) a hold load connected in series with said electronics switch where said load is disconnected from the telephone line when said electronic switch is in the nonconducting state and connected across the telephone line when said electronic switch is in the conducting state, where said hold load further comprises one or more nonlinear networks possessing the characteristic of passing less current than necessary to maintain conduction on said electronic switch unless the voltage across the nonlinear network exceeds a threshold value, said threshold voltage value selected to be higher than the voltage available to the nonlinear position of the hold load when the telephone line is loaded by both the hold load and any other line terminating load, the connection of which across the line is intended to release the hold, (c) a firing network connected across the telephone line where said network serves as a coupling means for a line transient that is produced when said telephone load is disconnected by said switching subsystem means, (d) a disarm/arm switch connected between said firing network and said electronic switch where when said disarm/arm switch is in the disarm position no control electrode current is applied to the control electrode of said electronic switch making said switch insensitive to the line transient and when placed in the arm position by the hold pushbutton on said switching subsystem means the line transient from said firing network is coupled to the control electrode of said electronics switch which causes said electronic switch to conduct which in turn connects said hold load onto the hold circuit at the time the telephone load is disconnected, (3) a line status display subsystem means that monitors and displays the status of each of said telephone lines connected to said key adapter set, and C. a system power supply having means to supply said system with required voltages and currents.

11. A stand-alone keyphone system comprising:

A. a telephone set,

B. a key adapter set integrally connected to said telephone set where said key adapter set further comprises:
 (1) a switching subsystem means that allows said telephone set to be connected and switched to a plurality of telephone lines connected to said key adapter set and/or to transfer any of the lines to a hole status,
 (2) a plurality of hold circuit subsystem means where each of said hold circuit subsystem means allows said telephone set to be temporarily disconnected from the telephone line selected by said switching means,
 (3) a line status display subsystem means that monitors and displays the status of each of said telephone lines connected to said key adapter set, wherein said line status display subsystem comprises:
  (a) a threshold generator circuit means that establishes and provides a set of reference threshold voltage levels that correspond to divisions between the various telephone line status, where said threshold generator circuit means further comprises:
   (1) a wink-rate oscillator designed to oscillate at a low frequency,
   (2) a resistive load network comprising a plurality of series connected resistors where input end of said network is connected to earth ground and opposite end is connected to circuit ground and where resistor nearest circuit ground is a modulating resistor, where earth ground is by definition of a zero earth-referenced potential from the geologic earth, and circuit ground corresponds to the circuit power supply reference node through which all power supply loop currents return to the supply,
   (3) a constant current diode connected between said circuit power supply and the input to said network,
   (4) a transistor having its base coupled to the output of said wink-rate oscillator and its collector-emitter junction connected across the modulating resistor on said network, where said transistor operates in only two states: saturated when on and cut-off when off, and C. a system power supply having means to supply said system with required voltages and currents.

12. A stand-alone keyphone system comprising:

A. a telephone set,

B. a key adapter set integrally connected to said telephone set where said key adapter set comprises:
 (1) a switching subsystem means that allows said telephone set to be connected and switched to a plurality of telephone lines connected to said key adapter set and/or to transfer any of the lines to a hold status,
 (2) a plurality of hold circuit subsystem means where each of said hold circuit subsystem means allows said telephone set to be temporarily disconnected from the telephone line selected by said switching means,
 (3) a line status display subsystem that monitors and displays the status the status of each of said telephone lines connected to said key adapter set where said subsystem further comprises:
  (a) a threshold generator circuit means that establishes and provides a set of reference threshold voltage levels that correspond to divisions between the various telephone line status,
  (b) a threshold sensor circuit that senses if the telephone line voltage is above or below the selected threshold voltage level applied from said threshold generator circuit where said circuit comprises a 2-input NOR gate having its input connected across a telephone line and its output connected to said lamp display circuit means and C. a system power supply having means to supply said system with required voltage and currents.

* * * * *